United States Patent

[11] 3,547,145

[72] Inventor Walter Holzer
 Meersburg (Bodensee), Schutzenrain, Germany
[21] Appl. No. 785,457
[22] Filed Dec. 18, 1968
 Division of Ser. No. 550,355, May 16, 1966, Patent No. 3,435,680.
[45] Patented Dec. 15, 1970

[54] APPARATUS FOR SENSING LEVELS IN CONTAINERS HOLDING LIQUIDS
 3 Claims, 7 Drawing Figs.
[52] U.S. Cl. .................................................. 137/392; 73/304
[51] Int. Cl. .................................................. E03c 1/242

[50] Field of Search ................................................ 137/386, 387, 391, 392; 73/295, 304; 340/233, 244

[56] References Cited
UNITED STATES PATENTS
| | | | |
|---|---|---|---|
| 3,029,354 | 4/1962 | Watkins | 137/386X |
| 3,181,557 | 5/1965 | Lannan, Jr. | 137/392X |
| 3,339,578 | 9/1967 | Smith | 137/392 |

Primary Examiner—William F. O'Dea
Assistant Examiner—David R. Matthews
Attorney—Harry Ernest Rubens ABSTRACT: Apparatus for sensing the rate of change of temperature due to changing liquid levels within a container, such as a washing machine, which rate of change is transformed into an electrical signal in turn applied to a response apparatus for switching and control purposes.

INVENTOR:
WALTER HOLZER
By
Attorney

INVENTOR:
WALTER HOLZER
By Harry Ernest Rubens
Attorney

APPARATUS FOR SENSING LEVELS IN CONTAINERS HOLDING LIQUIDS

The present invention relates to apparatus for sensing levels in containers holding liquids, particularly washing machines and the like, where the variable of state of a sensing means, for example its greater temperature in relation to the temperature of the liquid, changes irregularly as the level of liquid to be sensed approaches and reaches the sensing means. The application is a division of my application Ser. No. 550,355 filed May 16, 1966 and allowed with method claims now U.S. Pat. No. 3,435,680.

It is the object of the invention to increase the accuracy of and reduce the period of time necessary for the sensing of liquid levels.

It is already known to dispose a heated, thermally variable resistance in the liquid container in such a way that when the predetermined head of liquid is attained, the aforesaid resistance is cooled by the liquid so that its resistance value drops below a threshold value, tripping the control operation which terminates filling. However, the heat transfer from the liquid to the resistance of the sensing means is not constant, due to deposits of lime and dirt, so that a variable thickness of insulant is present on the sensing means which can absorb considerable changes in temperature, thus not only is the time required for the resistance to cool to the actuating temperature prolonged, but the temperature differential between the heated resistance and the liquid is reduced in an indefinite way. Furthermore, the heating output required to heat the resistance is naturally limited. Any drops of liquid remaining, for instance, from a previous filling, are also heated, therefore, which is particularly disadvantageous if such sensing means are located close to the bottom of the vessel and are used as a boil-dry protection because, by the time the resistance value has dropped to the preset threshold value, considerable time, for example 2 minutes may elapse, during which time the already empty container continues to be heated to an undiminished extent and may be damaged or destroyed as a result. The solution of increasing the temperature of the uncooled resistance, thus increasing the differential in respect of the liquid temperature sufficiently for the aforesaid influence to remain within tolerable limits, has, on structural grounds, proved to be difficult or not feasible.

Where such an unheated resistance is used as a temperature sensing means, then the inevitable deposits similarly cause an indefinite thermal delay and a corresponding falsification of the liquid temperament measurement. Such an arrangement is associated with all the deficiencies which occur with absolute measurement. In many cases, however, these disadvantages are taken into account because, on economic grounds, it would be unjustified to incorporate a further temperature sensing means. Also, the known scanning of liquid levels by means of at least one electrode inserted in insulated manner in the container wall has the disadvantage of being intensely dependent on dirt or lime deposits. If the conductance or the capacitance is used as the characteristic magnitude for liquid level sensing, then a very important factor is the cleanliness of the electrode surface, ensuring a constant transfer resistance to the liquid. For reliable functioning, such electrodes must therefore be cleaned regularly, which means additional work and this cannot always be done without damaging the electrodes.

It was therefore the object of the invention to avoid these disadvantages and to provide an apparatus by which reliable and accurate sensing of liquid levels could be carried out in a shorter time and independently of dirtiness of the sensing means.

This problem is resolved according to the invention by an apparatus for sensing levels in containers holding liquids, particularly washing machines and the like, in which the variable of state of a sensing means, for example its higher temperature in relation to the temperature of the liquid, is irregularly varied as the level of liquid to be sensed approaches and reaches the sensing means, in that it is not the absolute value of the variable state, but its temporal change, i.e., its rate of change, which is used as the characteristic magnitude for sensing the level of the liquid.

The aforesaid difficulties are therefore eliminated and the level of liquid is sensed reliably, quickly and accurately. As soon as the surface of the liquid reaches the level of the sensing means, the variable of state of this latter starts to change. A considerable advantage of the apparatus of the invention resides in that it is no longer necessary to wait until this change is completed, i.e., until the variable of state has reached its new limit value. Instead, the existence of a temporal change, which is naturally at its greatest at the start, is sufficient to cause the sensing means to respond. Of primary importance is the tendency of the change, in other words its direction, while the amount of the change is of secondary importance.

One embodiment of the apparatus of the invention is therefore characterized in that the variable of state is the transfer resistance or conductance between the two electrodes, one electrode being disposed at a predetermined height, the other electrode being below it, preferably near the bottom of the container.

In this case, therefore, the characteristic magnitude for scanning of the level of liquid is the rate of change of the resistance prevailing between two electrodes. When the container is empty, this resistance is equal to the insulation resistance, i.e., virtually infinitely great, whereas when in the filled state, it has a lower value which, in the case of a highly conductive liquid, may fall to practically nil. With the method according to the invention, however, it is not the exact value of the resistance or conductance which is important, but the fact of the temporal change, dirt or deposits being unimportant.

An embodiment in which, in per se known manner, the container itself acts as the counter electrode, is advantageous. This arrangement eliminates the need for a second electrode. If the conductivity of the liquid is sufficient, it will for practical purposes be at the potential of the container walls. This alternative embodiment is however also favorable in the case of a nonconductive liquid, when the variable of state is the capacitance between the measuring electrode and the counterelectrode or container.

According to another embodiment of the invention, the variable of state is the temperature-dependent electrical resistance of a heated structural component.

In this case, it is possible to manage with a conventional sensing means while avoiding the sources of error inherent in the conventional apparatus. Here, too, the essential advantage is that the actuating device is tripped at the moment when there is an appropriate rate of alteration, rather than when a predetermined switching temperature is reached at the sensing means; in other words, there is virtually no delay. The sensing signal, therefore, is the differential quotient of the resistance or conductance in relation to time. One embodiment of the apparatus provides for the absolute value of the electrical resistance of the heated component to be used for scanning the temperature of the liquid at the same time as it scans the level of the liquid.

This results in a simplification which at the same time means a saving on cost due to the reduction in components. The saving proves so advantageous that, beside it, the aforesaid disadvantages of absolute measurement become unimportant.

In a further embodiment of the invention, the temperature of the liquid is ascertained by a first sensing means which is not itself heated and which is preferably disposed close to the bottom of the container, while a second heated sensing means is disposed at a predetermined height and, as its ambient changes, in other words as liquid reaches it or leaves it, senses a rate of temperature change.

With such an arrangement, the upper of the two-sensing means serves as a level switch while the lower one is used as a temperature sensing means and possibly also as a boil-dry protection. For economic reasons, it is advantageous if the two-sensing means are of the same construction.

According to a further feature of the invention, both sensing means can act on the same arrangement which responds in like or unlike manner to the two different control magnitudes.

This measure permits further savings. In the case of sensing means with electrical components, the outlay or circuitry is reduced, because the sensing means can be connected with the same part of the control circuit, for example the same amplifier stage.

An advantageous specialized form of the invention provides for the sensing means to be inserted in electrically insulated manner in the container walls, for example in heat-conductive, force-fitted cartridges.

This arrangement permits of favorable heat transfer and simple fitment to cope with maintenance or repair operations.

The invention further provides for the temperature-dependent resistances of the two-sensing means to be wired together in a voltage divider with a further electrical component, the tapping of which is coupled to control the electrode of an amplifier, whose output has a measuring and a switching function.

This would make for simple evaluation of the signals transmitted by the sensing means. The measuring function of the amplifier can be achieved by the level of the voltage applied to the amplifier output, while the switching function is achieved by the response of a suitable device.

It is also expedient for the voltage divider tapping to be connected to the control electrode along two parallel paths, each of which provides passage for only one control magnitude.

Thus, the two signals fed to the same input are divided again before being amplified and differently affect the control electrode.

It is advantageous for one path to have galvanic coupling and the other capacity coupling.

Slowly changing signals will therefore reach the control electrode via the galvanic path, while rapid changes are transmitted through the capacity coupling. The dimensioning of the components is governed by the anticipated changes or rates of change.

In order to achieve the switching function of the amplifier, it is advantageous for a glow-discharge tube, tens diode or the like is applied to the amplifier output in series with a relay, transformer or the like.

Such a measure ensures, in a simple manner, that no change in the circuitry occurs until a predetermined striking or breakdown voltage is reached, but that a switching process will immediately be triggered when that happens.

An important further feature provided for the tapping of the voltage divider to be connected to the control electrode of the amplifier through an RC link, the coupling resistance being preferably at least one magnitude higher than the leak resistance of the control electrode.

Such a coupling arrangement can analyze the two different signals in a particularly elegant manner. However, due to the sharp reduction in voltage, it may be necessary to provide two or more amplifier stages.

An essential feature of the invention also resides in that temperature changes in only one direction are utilized for switching and control purposes, while changes in the other direction are ignored.

This arrangement is very advantageous, particularly in the case of heated containers, where the switching-on of the heating has to be interrupted until such a time as a preset level of liquid is reached. Due to the rapid response of the rate in temperature change of the sensing means, such a block is effective virtually without any delay.

Embodiments of the invention are explained hereinafter, further advantages and features of the invention becoming manifest from the description and the appended drawings, in which.

Figure 1:
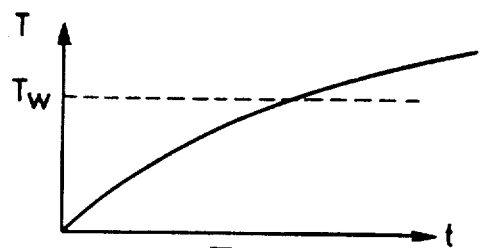
FIG. 1 is a typical heating-up curve for a liquid container.

As can be seen in FIG. 1, it takes a considerable time for the contents of a liquid container to become heated. The curve shows the rise of temperature T during the course of time $t$, a predetermined temperature level $T_u$, for example 65° C., also being shown in the diagram. As a rule, the contents of the container are heated very slowly, the average heating-up speed being for example 1 to 2° C./min.

Figure 2:
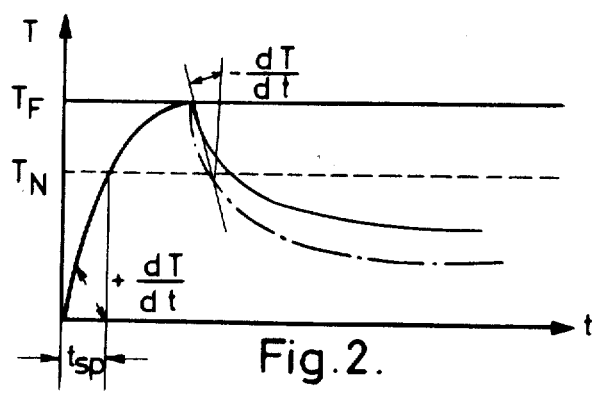
FIG. 2 shows the temperature curve of a sensing means fitted in the container while this is being filled.

FIG. 2 shows the temperature curve of a sensing means constructed as a heated electrical resistance, the heating of which is set in motion at the same time as the liquid container is put into service, in other words the first time the latter is filled. In the case of absolute value sensing, the temperature of the sensing means must have been reached by $T_F$ before the preset filling level is reached. Until at least the moment of time which is designated $t_{sp}$, sensing of the filling level must remain blocked, to prevent premature response of the control means. The rate of heating of the sensing means is high, for example 60 to 90° C./min. Cooling of the resistance from its normal working temperature, designated $T_F$, to the response value $T_N$ takes place through the resistance sheathing, in other words at a slightly slower speed, for example better than $45°\ C.\cdot\%_{min}$.

In the case of the differential sensing method, the control arrangement is ready to function as soon as the temperature of the resistance is slightly above the temperature of the liquid. A cooling process then takes place, with a negative $dT/dt$. Blocking during preheating of the resistance ($dT/d>$) is unnecessary with the differential quotient method, because the response can, by circuitry measures, be made easily dependent upon the sign of the differential quotient.

The process to be described later for simultaneous absolute temperature measurement and differential quotient sensing as a boil-dry protection are exactly the opposite.

Figure 3:
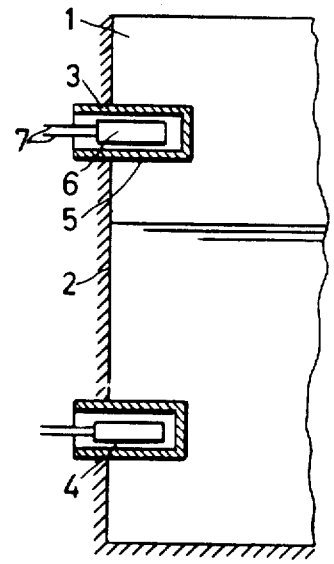
FIG. 3 shows the arrangement of the two-sensing means in the container wall.

The arrangement of the sensing means in the container is shown in FIG. 3. It will be seen that the container 1 has, in its wall 2 an upper sensing means 3 and a lower sensing means 4, an electrical resistance 6 with terminals 7 being provided inside a sheath 5. In the arrangement illustrated, the upper sensing means 3 functions as a level switch, the lower sensing means 4 as a temperature sensing means and a boil-dry protection. It is advantageous to use resistances with a high-temperature dependence, for example with a negative temperature coefficient. Such elements quickly respond to changes in temperature with an oppositely oriented resistance variation.

Figure 4:
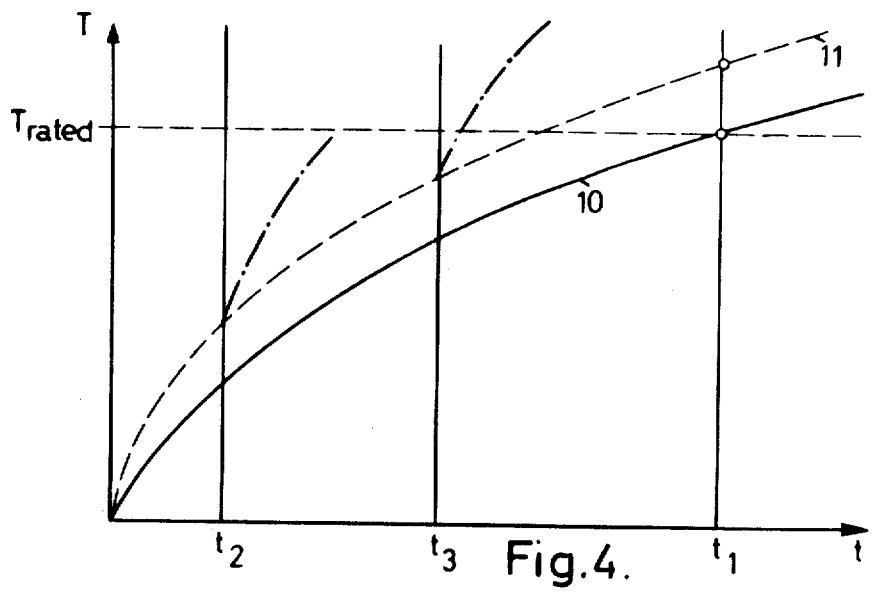
FIG. 4 shows, in principle, the temperature curve of container liquid and sensing means.

FIG. 4 shows how the lower sensing means 4 according to the invention functions. The curve 10 indicates how the temperature of the liquid changes as a function of the time, on a basis of the heat supplied. Above it is the sensing means temperature curve 11. Due to the fact that the sensing means has its own heating. The temperature of the sensing means is always something higher than that of the contents of the container. When the desired temperature of the liquid has reached the time $t_1$, therefore the sensing means is at a correspondingly higher temperature.

The instance of the resistance 6 of the lower sensing means 4 being heated without contact with the liquid, is shown in dash-dotted lines for the times $t_2$ and $t_3$ in FIG. 4. It will be seen that, in this case, there is an immediate sharp rise in sensing means temperature as compared with the progress of curve 11 and this irregular temperature change, with its very speed, is used according to the invention for switching and controlling purposes. The lower sensing means 4, therefore, serves as a quickly responding boil-dry protection because, when the sensing means is no longer in contact with the liquid, there is an immediately sharp differential quotient of the temperature in relation to the time.

Figure 5:
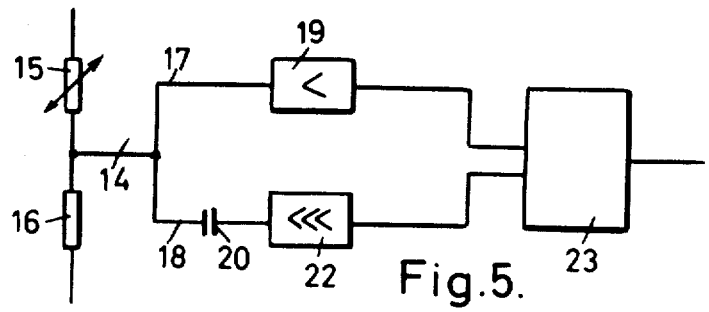
FIG. 5 shows the coupling of the sensing means signals to an amplifier arrangement.

The wiring diagram in FIG. 5 shows how the variable sensing means resistance 15, together with a fixed resistance 16, forms a voltage divider, the tapping 14 of which emerges into two different conductors 17 and 18. Conductor 17 is directly, i.e., galvanically coupled to an amplifier 19 (absolute value measurement), while conductor 18 is capacity coupled via the condenser 20 to the input of the amplifier 22 (measurement of the differential quotient). The outputs of amplifier 19 and amplifier 22 are taken to a response apparatus 23 which can for example consist of a glow-discharge tube with a series-connected relay.

Figure 6:
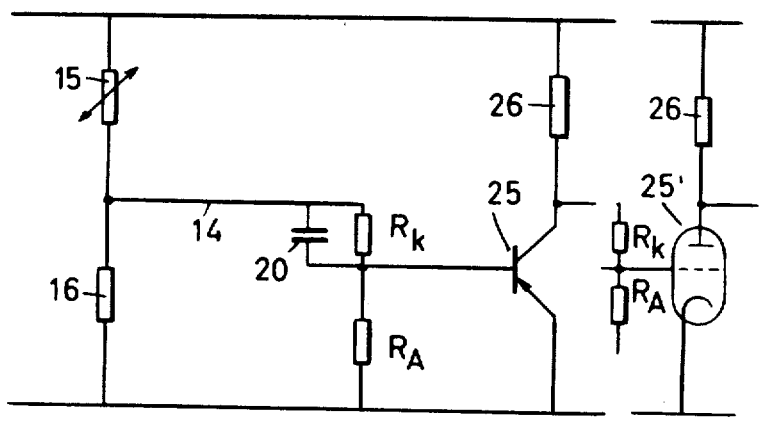
FIG. 6 shows a special example of such a coupling.

FIG. 6 shows a simplified arrangement in which the tapping 14 of the voltage divider, which is formed by the variable sensing means resistance 15 and the fixed resistance 16, is connected to an R-C link. This consists of the capacitor 20 and a coupling resistor $R_K$, the resistance value of which is preferably at least one magnitude above the leakage resistance $R_A$. Steep signal forms are therefore linked to the following amplifier stage 25 through the condenser 20 while very flat forms are linked to the same amplifier stage 25 but through the resistance $R_K$; the amplifier stage 25 is fed via the feed resistance 26 and is for example transistorised.

The invention is by no means limited to the use of the circuits illustrated. Any other circuit or arrangement which permits of the variable of state and its quotient to be separated may also be used.

Figure 7:
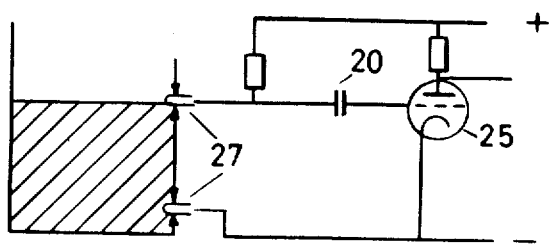
FIG. 7 shows an example of conductance sensing.

As a further embodiment, FIG. 7 shows the differential quotient sensing of the conductance of the liquid by means of sensitive electrodes 27.

Even though the invention has been explained hereinbefore substantially with reference to electric sensing means, it must be stressed that other sensing means can also be employed according to the invention. For example, it is conceivable that diaphragm capsules may serve as the sensing means, in which case the variable of state will be the pressure or volume and, according to any change thereof in relation to time, so these will serve as the characteristic magnitude for sensing the level of contents.

Every possibility of using the rate of change of a variable of state for sensing a level of contents may be described as an application of the invention.

I claim:

1. Apparatus for sensing levels in containers holding liquids, particularly washing machines, and the like, which comprises the following:
   a. A sensing means for sensing the rate of change of the temperature generated by changing liquid levels;
   b. Means for transforming the sensed rate of change into an electrical signal;
   c. Means for transmitting the signal to a responsive receiver;
   d. Means for measuring the signal to determine its magnitude; and
   e. A utilization means for receiving the measured signal whereby the rate of change of the temperature is used to control the liquid in the container.

2. The apparatus of claim 1 wherein the sensing means is positioned at a predetermined height in the container.

3. The apparatus of claim 1 wherein the utilization means is responsive only to a rate of change in only one direction.